(12) United States Patent
Natori

(10) Patent No.: US 8,482,775 B2
(45) Date of Patent: Jul. 9, 2013

(54) HANDOVER TECHNIQUE OF SET VALUES OF PRINTER DRIVERS

(75) Inventor: Takuya Natori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 12/847,232

(22) Filed: Jul. 30, 2010

(65) Prior Publication Data

US 2011/0063658 A1 Mar. 17, 2011

(30) Foreign Application Priority Data

Sep. 11, 2009 (JP) ................................. 2009-211027

(51) Int. Cl.
*G06F 3/12* (2006.01)
(52) U.S. Cl.
USPC ....................................................... 358/1.15
(58) Field of Classification Search
USPC ....................................................... 358/1.15
See application file for complete search history.

(56) References Cited

U.S. PATENT DOCUMENTS

| 7,325,235 | B2 | 1/2008 | Iida et al. |
|---|---|---|---|
| 2002/0035941 | A1 | 3/2002 | Nakao |
| 2003/0079063 | A1 | 4/2003 | Iida et al. |
| 2005/0078983 | A1 | 4/2005 | Maruyama et al. |
| 2005/0286100 | A1 | 12/2005 | Uotani et al. |
| 2011/0063659 | A1* | 3/2011 | Sakura .......................... 358/1.15 |

FOREIGN PATENT DOCUMENTS

| CN | 1773456 A | 5/2006 |
|---|---|---|
| CN | 1885256 A | 12/2006 |
| CN | 101256474 A | 9/2008 |
| CN | 101277355 A | 10/2008 |
| CN | 101334719 A | 12/2008 |
| JP | 2003-131832 | 5/2003 |
| WO | 2008129769 A1 | 10/2008 |

OTHER PUBLICATIONS

Office Action dated Jan. 30, 2013 in U.S. Appl. No. 12/852,608.
Chinese Office Action dated Mar. 5, 2013, concerning Chinese Patent Application No. 201010278989.4.
Chinese Office Action dated Mar. 5, 2013, concerning Chinese Patent Application No. 201010279020.9.

* cited by examiner

*Primary Examiner* — Eric A Rust
(74) *Attorney, Agent, or Firm* — Fitzpatrick, Cella, Harper & Scinto

(57) ABSTRACT

A control method of an information processing apparatus in which a plurality of printer drivers for setting set values in setting items of print data to be output by a printing apparatus are installed, the method comprises: under the control of an operating system having a function of controlling the plurality of printer drivers to share set values set using the plurality of printer drivers, a setting item determination step of determining, upon switching of output target printing apparatuses between a plurality of printing apparatuses corresponding to the plurality of printer drivers, whether or not setting items according to a printing apparatus before switching and setting items according to a printing apparatus after switching include common setting items.

10 Claims, 17 Drawing Sheets

FIG. 8

8a
- 901: <Printer PrinterC_192.168.1.10_>
- 902:     Info PrinterC
- 903:     Location 2F
- 904:     DeviceURI lpd://192.168.1.10
- 905:     DriveName ABC PDL1
- 906: </Printer>

8b
- 1001: *% Printer Description for PrinterC
- 1002: *Manufacuturer: "ABC"
- 1003: *Product: "PrinterC"
- 1004: *PrinterLanguage: ABC PDL1
- 1005: *DriverVersion: "PDL1 1.00"

- 1006: *OpenUI *PageSize: PickOne
- 1007: *DefaultPageSize: A4
- 1008: *PageSize A3
- 1009: *PageSize A4
-     . . . . . .
- 1010: *CloseUI *PageSize

- 1011: *OpenUI *Duplex: PickOne
- 1012: *DefaultDuplex: None
- 1013: *Duplex None
- 1014: *Duplex Simplex
- 1015: *Duplex Duplex
- 1016: *CloseUI *Duplex

FIG. 11

11a {
1301:  <DefaultPrinterInfo>
1302:      DefaultPrintQueue  PrinterA
1303:  </DefaultPrinterInfo>

11b {
1401:  <CustomPresetsList>
1402:      <PresetSettings name=  "standard"  >
1403:      </PresetSettings>
1404:      <PresetSettings name=  "Preset1"  >
1405:          ABC.ColorMode   Color
1406:          ABC.Duplex   Simplex
1407:          ABC.Resolution   600
1408:          ABC.LastQueue   NULL
1409:      </PresetSettings>
1410: </CustomPresetsList>

11c {
1501:  <PresetInfo>
1502:      DefaultPreset  Prest1
1503:  </PresetInfo>

11d {
1601:  <CurrentPrintInfo>
1602:      <CurrentPrintQueueInfo>
1603:          CurrentPrintQueue  PrinterC
1604:      </CurrentPresetQueueInfo>
1605:      <CurrentPresetInfo>
1606:          CurrentPreset  Standard
1607:      </CurrentPresetInfo>
1608:      <CurrentSettings>
1609:          ABC.ColorMode   Color
1610:          ABC.Duplex   Simplex
1611:          ABC.Resolution   1200
1612:          ABC.LastQueue   PrinterA
1613:      </CurrentSettings>
1614:  </CurrentPrintInfo>

F I G. 14A

| PrintQueue | PrinterA | PrinterB | PrinterC |
|---|---|---|---|
| ColorMode | Mono/Color | Mono/Color | Mono |
| Duplex | Simplex/Duplex | Simplex/Duplex | Simplex/Duplex |
| Resolution | 600/1200 | 600/1200 | 600 |
| LastQueue | NULL | NULL | NULL |

1901, 1902, 1903

F I G. 14B

| Preset | Standard | Preset1 |
|---|---|---|
| ColorMode | NULL | Color |
| Duplex | NULL | Simplex |
| Resolution | NULL | 600 |
| LastQueue | NULL | NULL |

2001, 2002

HANDOVER TECHNIQUE OF SET VALUES OF PRINTER DRIVERS

BACKGROUND OF THE INVENTION

1. Field of the Invention

The present invention relates to a handover technique of set values of printer drivers.

2. Description of the Related Art

Conventionally, some methods or inventions have been proposed in association with handling of print settings when the user switches printer drivers in an environment in which a plurality of printer drivers are installed in an information processing apparatus. When the user switches printer drivers on the information processing apparatus in which the plurality of printer drivers are installed, operations associated with print settings are different depending on operating systems (OSs). That is, for those operations multiple methods exist.

On certain OS's, printer drivers operate as independently. In this case, when the user switches a printer driver, print values of a printer driver set before switching are independent of those after switching. For this reason, when the user changes the print set values of the printer driver before switching, the altered print values are not reflected after the printer driver is switched. Japanese Patent Laid-Open No. 2003-131832 has proposed a method of handing over print settings upon switching printer drivers premised on the OS which performs such operation. In this invention, upon switching printer drivers, it is determined if the printer drivers before and after switching are of an identical type. If it is determined that these printer drivers are of the identical type, the print set values of the printer driver before switching are handed over intact to those after switching.

On another OS different from the aforementioned OS, once a printer driver is selected, the OS itself holds crossover print settings for a plurality of switchable printer drivers until a print job is complete or canceled later. When the user switches printer drivers, the OS intervenes to hand over the print settings of the printer drivers before and after switching, thus sharing the same settings.

A problem to be solved by the present invention is premised on a print system in which an OS (to be also referred to as a given OS hereinafter) holds crossover print set values for printer drivers, as described in the related arts.

In a scene in which after the user makes print settings on a certain printer driver, an output target printer is not a desired one of the user, and he or she switches printer drivers, there is a merit of this system. That is, in case of a print system in which an OS does not hold any crossover print settings for printer drivers (print settings of respective printer drivers are independent from each other), the user has to perform operations in order to set the same print settings again on a printer driver after switching. By contrast, in this system, since the print settings made on a certain printer driver are handed over to a printer driver after switching, there is a merit in that the user need not perform operations in order to set the same print settings again.

However, in this system, as for common print setting items to printer drivers before and after switching, when their default set values are different, this mechanism poses a problem in some cases. For example, a case will be examined below wherein in association with two printer drivers A and B which allow both monochrome and color settings, a default set value is "monochrome" for driver A, and "color" for driver B. At this time, the user does not change the monochrome/color setting before switching a printer driver. Under this precondition, when the user switches the printer driver from A to B, since the default set value of printer driver B is "color", it is expected that the monochrome/color setting is also switched to "color". However, since the print settings of printer driver A are handed over, the monochrome/color setting after switching to printer driver B is still "monochrome".

The user can name and save a combination of setting items and set values of print settings in advance, and such a combination is called a preset. When the user sets a preset, he or she can easily perform an output operation using print settings which are defined in advance. However, when the user switches printer drivers after he or she sets a preset, some settings of the preset are invalidated in some cases. For example, a case will be examined below wherein a monochrome/color setting in a certain preset is "color", printer driver A allows to select both monochrome and color settings, and printer driver B is exclusive for a monochrome setting. In this case, when the user applies that preset to printer driver A first, the monochrome/color setting is "color", which follows the user's intention. In this situation, a case will be examined below wherein the user switches the printer driver to B, and then returns it to A later. When the user switches the printer driver to B, the monochrome/color setting is forcibly set to be "monochrome", and even when the user returns the printer driver to A later, that monochrome setting is unwantedly handed over. For this reason, although the preset is intended to color printing, if the user executes a print operation in that state, a monochrome image is output.

That is, when the user repetitively switches printer drivers without changing settings, unexpected print settings may be made.

As described above, when print settings are handed over between different printer drivers according to the specification of the given OS, a print operation may be made to have settings against the user's intention or the user has to carefully confirm and reset set values of respective setting items, thus causing a disadvantageous situation. As a result, usability and efficiency are impaired.

SUMMARY OF THE INVENTION

The present invention solves the aforementioned problems in an environment in which a given OS holds crossover print settings for printer drivers.

According to one aspect of the present invention, there is provided a control method of an information processing apparatus in which a plurality of printer drivers for setting set values in setting items of print data to be output by a printing apparatus are installed, the method comprising: under the control of an operating system having a function of controlling the plurality of printer drivers to share set values set using the plurality of printer drivers, a setting item determination step of determining, upon switching of output target printing apparatuses between a plurality of printing apparatuses corresponding to the plurality of printer drivers, whether or not setting items according to a printing apparatus before switching and setting items according to a printing apparatus after switching include common setting items; a set value determination step of determining, in association with the common setting items determined in the setting item determination step, whether or not default set values in the printing apparatus before switching match set values set upon switching of the printing apparatuses; a handover step of handing over the set value set upon switching of the printing apparatuses in association with the setting item which is determined in the set value determination step that the set value of the setting item does not match the default set value; and a setting step of setting a default set value in the printing apparatus after switching in association with the setting item which is determined in the set value determination step that the set value of the setting item matches the default set value.

According to another aspect of the present invention, there is provided a control method of an information processing apparatus in which a plurality of printer drivers for setting set values in setting items of print data to be output by a printing apparatus are installed, the method comprising: under the control of an operating system having a function of controlling the plurality of printer drivers to share set values set using the plurality of printer drivers, a storage step of storing a preset which defines, in advance, print setting items and set values to be set in the print data; a preset setting item determination step of determining, upon switching of output target printing apparatuses between a plurality of printing apparatuses corresponding to the plurality of printer drivers, whether or not setting items according to a printing apparatus after switching and setting items included in the stored preset include common setting items; and an overwriting step of overwriting set values of the common setting items determined in the preset setting item determination step by the set values in the preset.

According to another aspect of the present invention, there is provided an information processing apparatus in which a plurality of printer drivers for setting set values in setting items of print data to be output by a printing apparatus are installed, the apparatus comprising: under the control of an operating system having a function of controlling the plurality of printer drivers to share set values set using the plurality of printer drivers, a setting item determination unit which determines, upon switching of output target printing apparatuses between a plurality of printing apparatuses corresponding to the plurality of printer drivers, whether or not setting items according to a printing apparatus before switching and setting items according to a printing apparatus after switching include common setting items; a set value determination unit which determines, in association with the common setting items determined by the setting item determination unit, whether or not default set values in the printing apparatus before switching match set values set upon switching of the printing apparatuses; a handover unit which hands over the set value set upon switching of the printing apparatuses in association with the setting item which is determined by the set value determination unit that the set value of the setting item does not match the default set value; and a setting unit which sets a default set value in the printing apparatus after switching in association with the setting item which is determined by the set value determination unit that the set value of the setting item matches the default set value.

According to another aspect of the present invention, there is provided an information processing apparatus in which a plurality of printer drivers for setting set values in setting items of print data to be output by a printing apparatus are installed, the apparatus comprising: under the control of an operating system having a function of controlling the plurality of printer drivers to share set values set using the plurality of printer drivers, a storage unit which stores a preset which defines, in advance, print setting items and set values to be set in the print data; a preset setting item determination unit which determiners, upon switching of output target printing apparatuses between a plurality of printing apparatuses corresponding to the plurality of printer drivers, whether or not setting items according to a printing apparatus after switching and setting items included in the stored preset include common setting items; and an overwriting unit which overwrites set values of the common setting items determined by the preset setting item determination unit by the set values in the preset.

According to the present invention, even in an environment in which the given OS is used, print settings can be flexibly handed over to reflect the user's intention associated with the print settings upon switching output target printers.

Further features of the present invention will become apparent from the following description of exemplary embodiments (with reference to the attached drawings).

BRIEF DESCRIPTION OF THE DRAWINGS

FIG. 8 is a view showing examples of definition files according to the embodiment;

FIG. 11 is a view showing examples of definition files according to the embodiment;

FIGS. 14A and 14B are tables showing preconditions in handover examples according to the embodiment;

DESCRIPTION OF THE EMBODIMENTS

First Embodiment

The best mode for carrying out the present invention will be described hereinafter using the drawings.

[System Arrangement]

Figure 1:
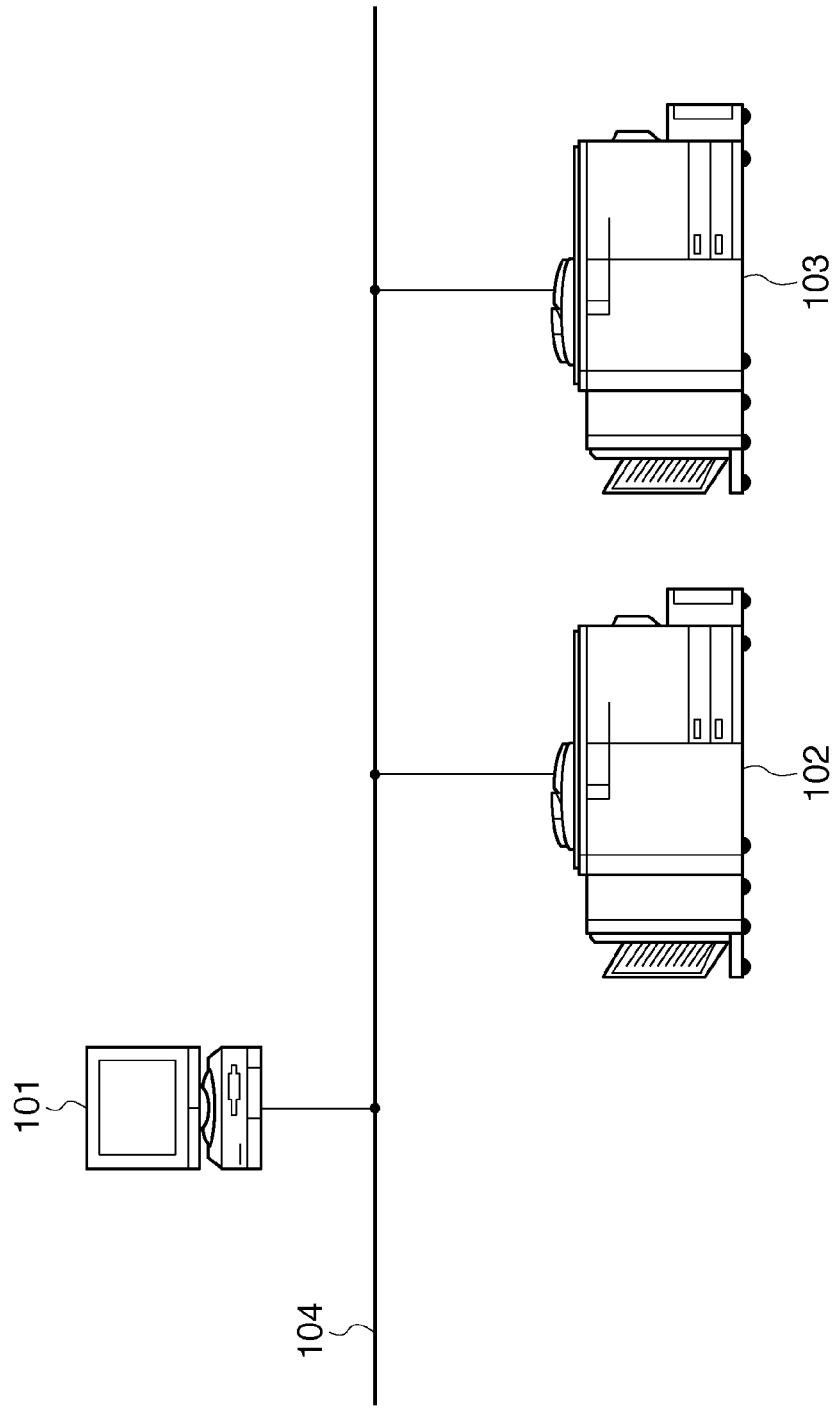
FIG. 1 is a view showing an example of the arrangement of a print system according to an embodiment of the present invention.

FIG. 1 shows an example of a print system required to implement a printer driver set value handover method according to the present invention. To a computer network 104, a client computer 101 as an information processing apparatus, and network printers 102 and 103 are connected. In the client computer 101, an operating system (to be abbreviated as an OS hereinafter), applications, and a plurality of printer drivers are installed. With this print system, the user can transmit user data from the client computer 101 to the network printer 102 or 103, and can print it out.

Figure 2:
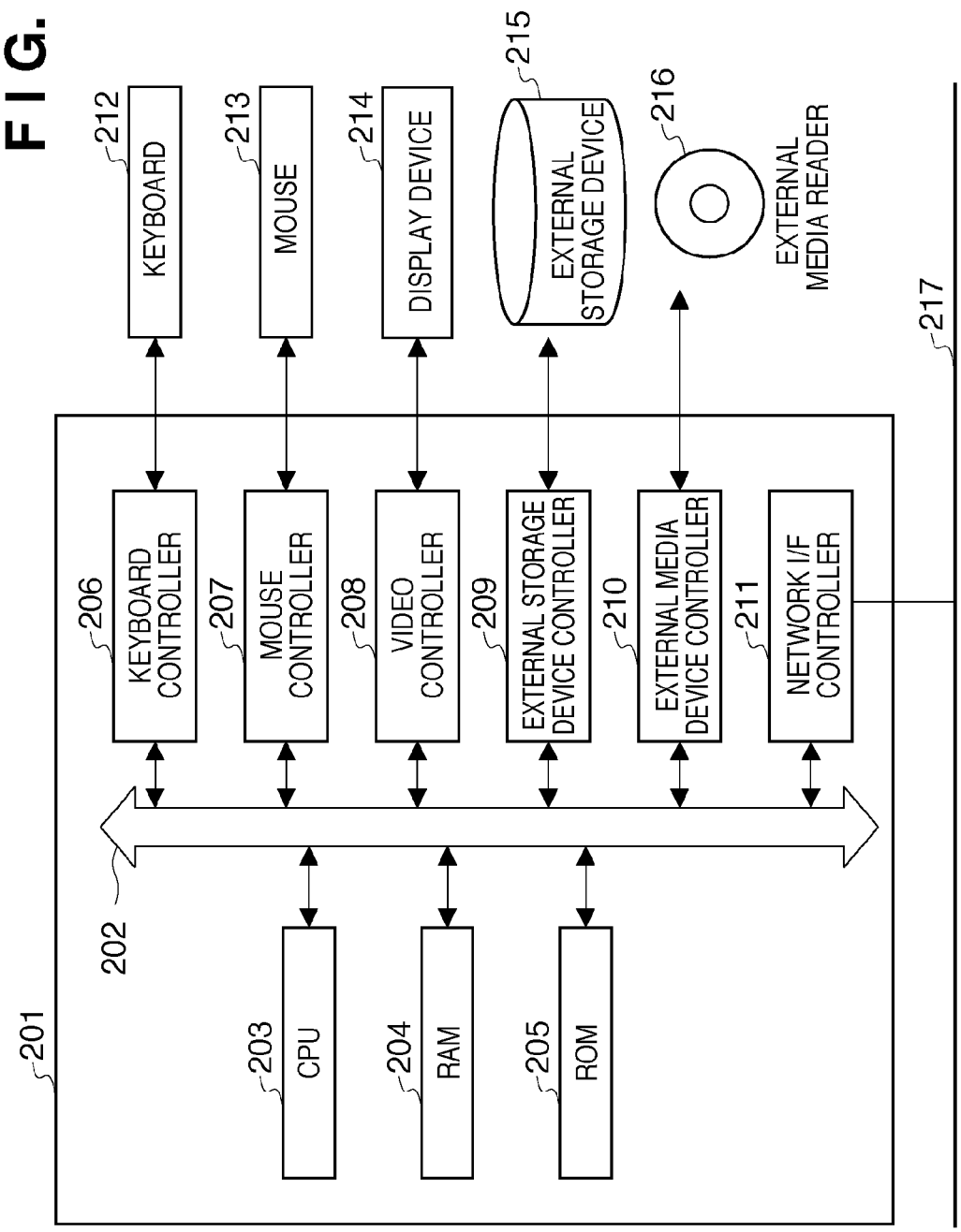
FIG. 2 is a block diagram of a client computer according to the embodiment.

FIG. 2 is an internal block diagram of the client computer 101. A client computer 201 shown in FIG. 2 is the same as the client computer 101. The client computer includes a central processing unit (CPU) 203, a RAM 204 as a volatile memory, a ROM 205 as a nonvolatile memory, a keyboard controller 206, a mouse controller 207, a video controller 208, an external storage device controller 209, an external media device controller 210, and a network I/F controller 211. A keyboard 212 and mouse 213 used by the user to operate the client computer 201 are respectively connected to the keyboard controller 206 and mouse controller 207 of the client computer 201. A display device 214 is connected to the video controller 208 of the client computer 201. A nonvolatile external storage device 215 used to save large-capacity data is connected to the external storage device controller 209, and undergoes read/write accesses of applications and data. When an application, driver software, and the like are provided using external media (CD-ROM, DVD-ROM, etc.), the user sets an external medium on an external media reader 216, and the external media device controller 210 can load a program from the external medium. Note that the computer network 104 described in FIG. 1 is connected to the network I/F controller 211 to communicate with other devices.

Normally, an initial program required to activate the client computer 201, and a basic program required to control respective modules of the client computer 201 are saved in the ROM 205. Also, the OS, applications, and printer drivers are saved in the external storage device 215. When the power switch of the client computer 201 is turned on, a program (boot loader) which is saved in the ROM 205 and is required to activate the computer is executed. That program loads the OS saved in the external storage device 215 onto the RAM 204, and then passes a control right to the OS. The OS further loads required modules and drivers from the external storage device 215 onto the RAM 204. Also, the OS loads a required application from the external storage device 215 onto the RAM 204 in response to a user instruction, and executes the loaded program. Printer drivers and their installers to be described in this embodiment are provided using external media such as CD-ROMs, each of which is set in the external media reader 216. Then, the CPU 203 loads such printer driver or installer into the RAM 204 or saves it in the external storage device 215 as needed. The OS used as a condition in the present invention includes, for example, "Mac OS X" (trademark) available from Apple.

[Printer Driver Installation and Print Queue Registration]

Figure 3:
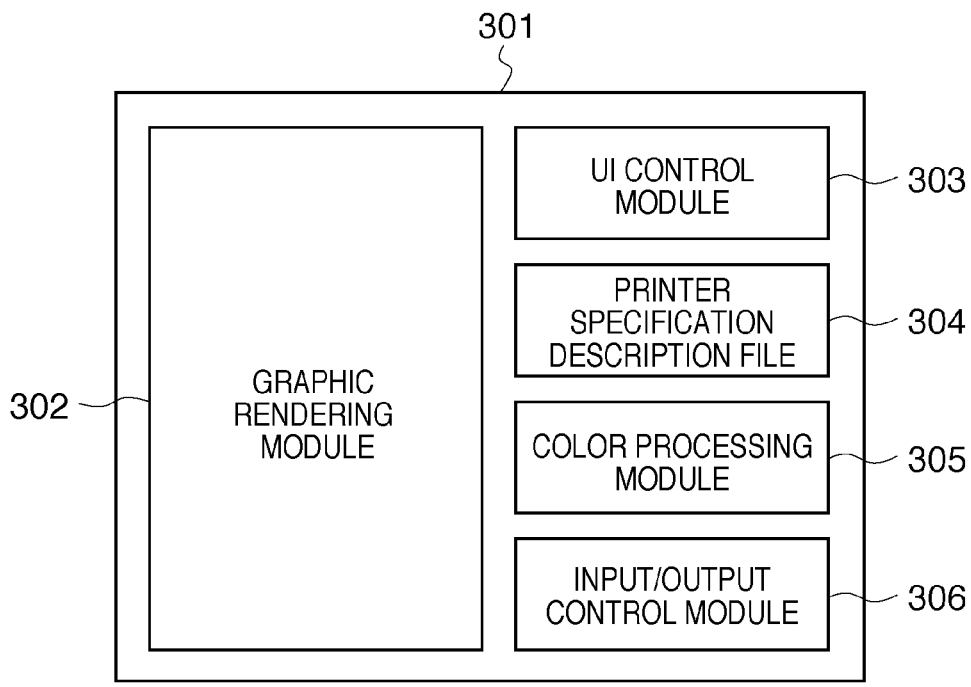
FIG. 3 is a diagram showing the module configuration of a printer driver according to the embodiment.

A printer driver will be described below with reference to FIG. 3. The printer driver includes modules, as shown in FIG. 3. A printer driver 301 includes a graphic rendering module 302, UI control module 303, printer specification description file 304, color processing module 305, and input/output control module 306. Note that the present invention is not limited to such specific configuration, and the printer driver may include other modules depending on its function.

The printer driver has some generation methods. For example, in one method, in order to support a plurality of printers by a single printer driver, the graphic rendering module 302 and UI control module 303 are generated to be able to support the plurality of printers. The printer specification description file 304 is supplied with a printer driver in accordance with a printer to be supported. In this method, the UI control module 303 displays or controls a UI in correspondence with the printer specification description file 304. The graphic rendering module 302 is configured to issue a page description language and printer control commands in correspondence with each printer.

Figure 4:
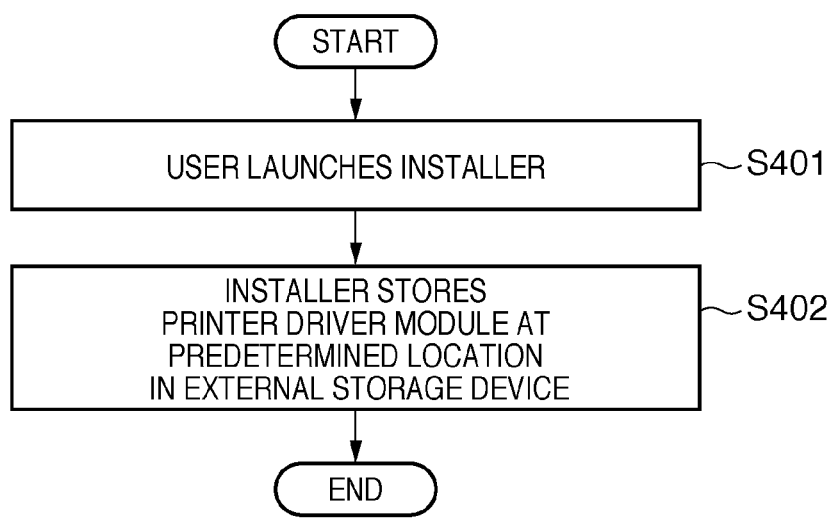
FIG. 4 is a flowchart of a printer driver installation method according to the embodiment.

The sequence for installing the printer driver with the above configuration in the client computer 201 will be described below with reference to FIG. 4. Assume that the user prepares a storage medium such as a CD-ROM which stores a printer driver, or acquires a printer driver installer via the network. In step S401, the user launches the acquired printer driver installer. In response to this action, the installer stores printer driver modules at a predetermined location of the external storage device in step S402. Storage locations are different depending on print systems. For example, a CUPS (Common Unix Printing System) is set to store printer driver modules for respective vendors under the following directory:

/Library/Printers/

Furthermore, printer drivers can be stored in correspondence with their types under the directory for each vendor. For example, when different printer drivers PDL1 and PDL2 of vendor "ABC" are available, the following directories are created, and these printer drivers can be stored under these directories.

/Library/Printers/ABC/PDL1/
/Library/Printers/ABC/PDL2/

In step S402, the installer stores printer driver modules under the aforementioned directory in the external storage device 215. The installation of the printer driver is complete. However, in order to output data using a desired printer in practice, the user has to register a print queue corresponding to the desired printer using a program which is provided by, for example, the OS and is required to register a print queue.

Figure 5:
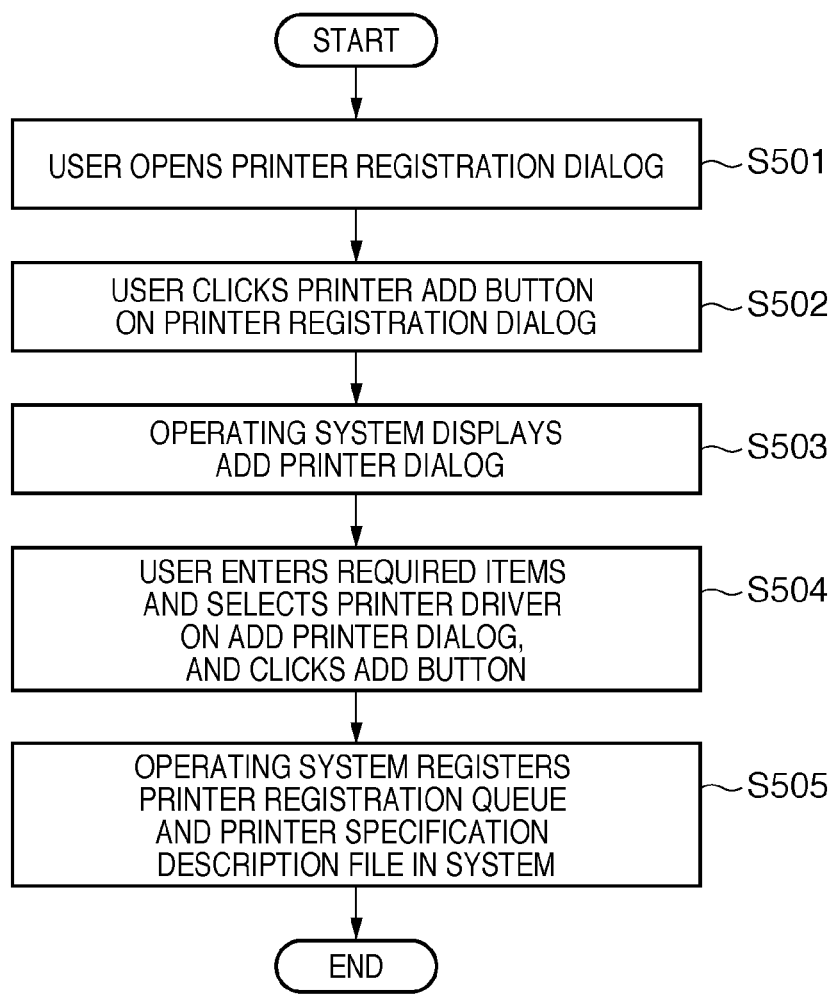
FIG. 5 is a flowchart of a print queue registration method according to the embodiment.

FIG. 5 shows the sequence for registering a print queue. The sequence of processing will be described along this sequence using necessary drawings.

Figure 6:
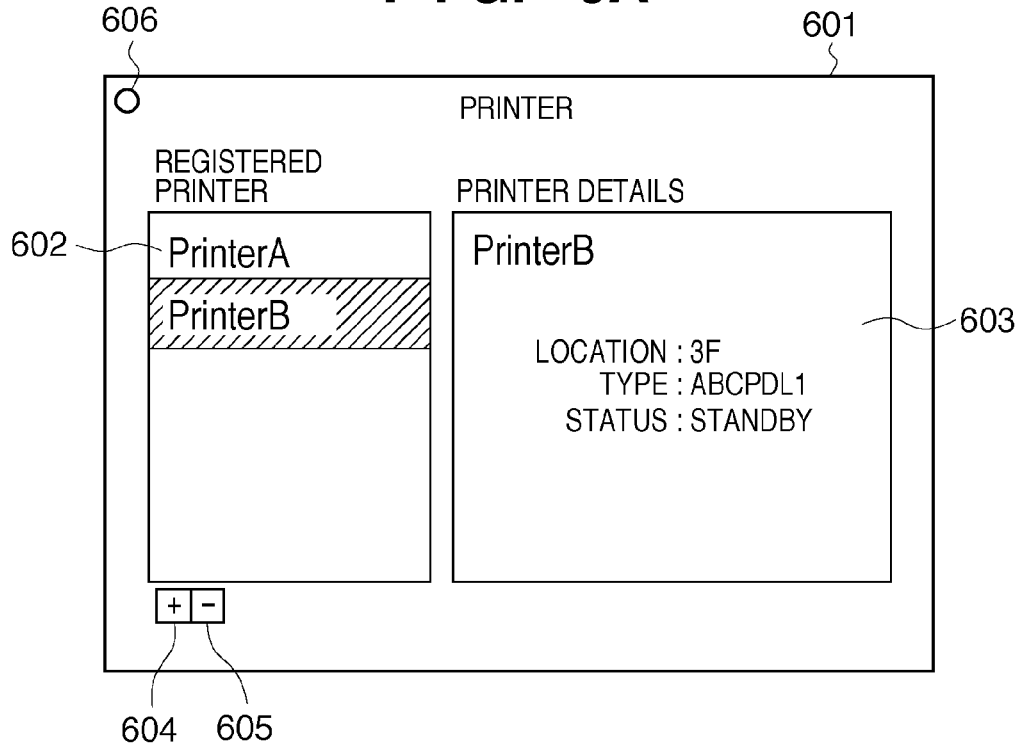
FIGS. 6A and 6B are views showing an example of a print queue registration UI according to the embodiment.

In step S501, the user opens a printer registration dialog 601 required to register a print queue. In this step, the OS reads out a program code for printer registration from the external storage device 215 onto the RAM 204, and executes the readout program. FIG. 6A shows an example of a user interface (to be abbreviated as a UI hereinafter) of the printer registration dialog displayed by the OS. This dialog includes a registered print list 602 used to display a list of printers, print queues of which are currently registered, and a print queue detailed display area 603 used to display detailed information of a printer selected on the registered print list 602. Also, the dialog includes a print queue add button 604 used to add a new print queue, a button 605 used to delete a print queue currently selected on the registered print list 602, and a button 606 used to close this dialog.

In step S502, the user clicks the print queue add button 604 on the printer registration dialog 601. In response to this user operation, the OS displays an add printer dialog 701 in step S503. The user enters required information in the add printer dialog 701 in step S504 to add a printer. FIG. 6B shows an add printer dialog displayed by the OS. The add printer dialog 701 includes a setting field 702 used to designate a network address (an IP address in this example) of a connected printer, a setting field 703 used to input a name required to identify a print queue, and a setting field 704 used to input an installation location of the printer. The name 703 and printer location 704 include character strings used when they are displayed on the registered print list 602 and print queue detailed display area 603 of the printer registration dialog. The add printer dialog 701 also includes a setting field 705 used to designate a printer driver used upon registration of a print queue. Note that the configuration of the add printer dialog 701 shown in FIG. 6B is an example, and additional information (for example, information of a license key) may be input as needed. The registered print queue is displayed in the registered print list shown in FIG. 6A. In the setting field 705, the OS lists up printer drivers stored under the printer driver storage directory (/Library/Printers/) of the OS described above.

The example of FIG. 6B shows a state in which the user inputs an IP address "192.168.1.10", a printer name "PrinterC", and a printer location "2F", and selects a printer driver "ABC PDL1". When the user clicks the add button 706 in this state, the OS adds a print queue. As a result, a new printer is additionally registered as an available printer. When the user wants to close this dialog without adding any printer, he or she clicks a button 707.

In step S505, the OS registers the print queue designated by the user and the printer specification description file in the system. This step will be described in detail below using FIGS. 7 to 16.

Figure 7:
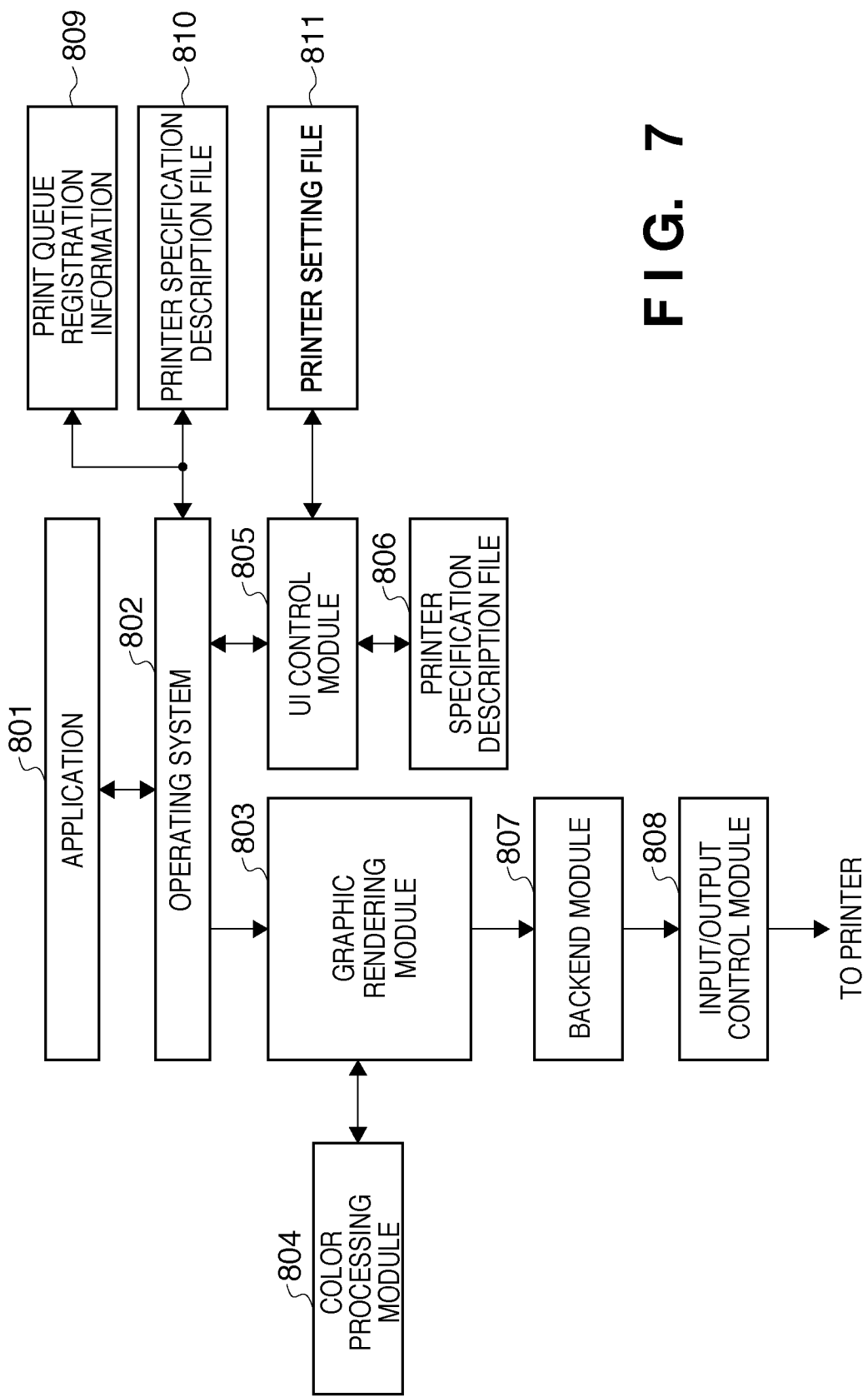
FIG. 7 is a block diagram showing the configuration of a printer driver system according to the embodiment.

FIG. 7 is a system block diagram showing a state in which the print queue has already been registered. Referring to FIG. 7, a graphic rendering module 803 corresponds to the graphic rendering module 302 of the printer driver, which is stored under the predetermined directory (/Library/Printers/) of the OS in the aforementioned sequence. Likewise, a UI control module 805 corresponds to the UI control module 303 of the installed printer driver. A color processing module 804 corresponds to the color processing module 305 of the installed printer driver. An input/output control module 808 corresponds to the input/output control module 306 of the installed printer driver. A printer specification description file 806 corresponds to the printer specification description file 304 of the installed printer driver. Note that a backend module 807 is provided by the OS, and is used to pass over print data generated by the graphic rendering module 803 to the input/output control module 808 used to transmit the print data to the printer. Also, print queue registration information 809, a printer specification description file 810, and a printer setting file 811 are generated by the OS during the printer registration process in FIG. 5, and will be described in detail below.

In step S505, an OS 802 acquires information input to the add printer dialog 701, and executes print queue registration processing. This registration is executed as follows. Descriptions 8a of FIG. 8 shows a file which describes information of a print queue to be registered, and is described in a markup language. A line 901 indicates an identifier of the print queue, which is described by tying a printer name and printer address by an underscore. Lines 902 and 903 respectively describe a printer name and location. Furthermore, a line 904 includes a description of an address of the print queue, and indicates to transmit data to an address "192.168.1.10" via the lpd protocol in this example. A line 905 describes a printer driver name (ABC PDL1 in this case) used by this printer. A line 906 corresponds to the line 901, and indicates the end of the description. The OS creates this description file in step S505, and additionally records this printer registration information in a predetermined file in the external storage device 215. As this predetermined file, for example, the OS describes information in a printers.conf file stored under a /etc/cups/ directory in the CUPS (Common Unix Printing System). This is the print queue registration information 809. When a plurality of print queues are registered, the printers.conf file repetitively includes descriptions 8a of FIG. 8 corresponding to respective printers for respective print queues.

In step S505, the OS then registers the printer specification description file in the system. In FIG. 7, the OS 802 acquires the printer specification description file 806 of the printer to be registered from the UI control module of the printer driver, and then registers a generated printer specification description file 810 at a predetermined location of the system.

Prior to the description of the registration method of the printer specification description file 810, the printer specification description file will be explained. Descriptions 8b of FIG. 8 shows an example of the printer specification description file. This file is described according to a specification description format of the printer. The file will be described below based also on the format.

A line 1001 describes a comment. The comment includes "*%" at the line head. A line 1002 describes a vendor name. A line 1003 describes a printer name supported by this printer specification description file. A line 1004 describes a page description language supported by this printer specification description file. A line 1005 describes a version of the printer driver. A line 1006 and subsequent lines describe function specifications of this printer. In the function specifications, one function is defined in lines 1006 to 1010.

The line 1006 includes a function name with a prefix "*" after "*OpenUI", and a type of a print set value used upon selecting the function, which is delimited by ":" after the function name. The type of the print set value includes "PickOne" and "Boolean". "PickOne" expresses a function of selecting one from options. "Boolean" expresses that this function is controlled by On/Off.

The line 1006 expresses that a function "*PageSize" is available, and is to select one from options. A line 1007 describes a default set value (to be referred to as a default value hereinafter) of this function. This line starts with "*Default", and the function name defined in the previous line 1006 is appended after "*Default". This line indicates that the default value of the function "PageSize" is "A4". From the line 1007 until "*CloseUI" in a line 1010, each of options of this function is described per line. For example, a line 1008 expresses that "A3" is available as one of options of "PageSize". Note that these lines describe the function of selecting a page size, and since there are many options of the page size, descriptions of some options are not shown. A last description of this function is the line 1010, which describes the function name described in "*PageSize" after "*CloseUI". These lines express one function.

Subsequently, lines 1011 to 1016 include descriptions of another function. A repetitive description will be avoided. This block expresses that a function "Duplex" is available, and is to select one of options (PickOne), which include "None", "Simplex", and "Duplex". In practice, this expresses a duplex print designation function: "None" follows a default setting of the printer without any designation; "Simplex" means simplex printing; and "Duplex" means duplex printing.

Figure 9:
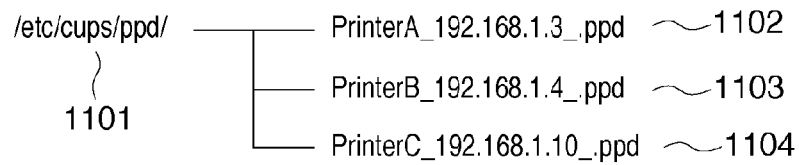
FIG. 9 is a view showing an example of registered printer specification description files according to the embodiment.

The method of registering this printer specification description file by the OS will be described below. The OS acquires this printer specification description file 806 corresponding to the printer from the UI control module 805, and stores it at a predetermined location of the system. FIG. 9 shows the storage location and that file. The storage location is under a /etc/cups/ppd/ directory in the external storage device 215, and the stored file has a file name obtained by appending the printer name and printer address which are tied by an underscore. For example, a printer specification description file added in this case is "PrinterC_192.168.1.10_.ppd" in a line 1104. FIG. 7 indicates that the OS 802 stores the printer specification description file in the printer specification description file 810. With the aforementioned steps, the registration of the print queue is complete.

[Print Queue and Preset Settings]

Figure 10:
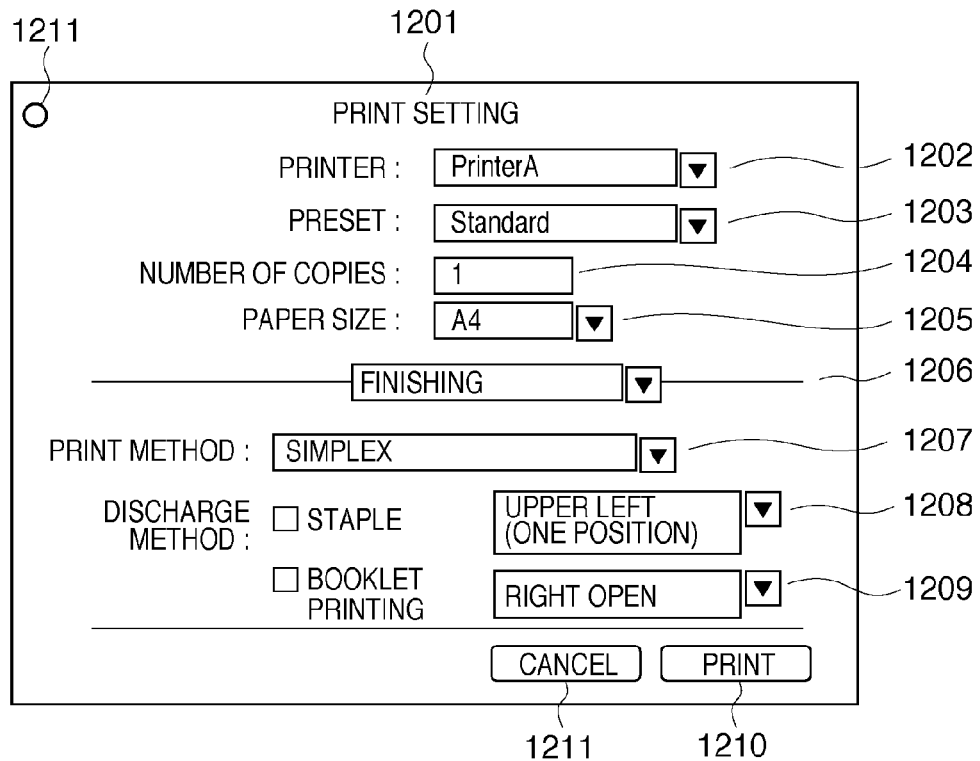
FIG. 10 is a view showing an example of a print setting dialog according to the embodiment.

The print queue and preset settings will be described below. FIG. 10 shows a screen associated with print settings of the registered print queue. This screen is a dialog displayed when the user selects a menu "print" included in, for example, a file menu of an application 801.

On an print setting dialog 1201, the system commonly provides setting fields 1202 to 1205. This dialog allows the user to select an output target printer (print queue) and a preset (to be described later), to set the number of copies, and to designate a paper size as basic functions. Also, the user can additionally set functions unique to each of various printers. When the printer includes many functions, all the functions are not displayed at the same time, but a function group is switched using a setting field 1206. This dialog shows a display state of functions related to "finishing". The finishing related functions include a simplex/duplex designation in a setting field 1207, a staple designation in a setting field 1208, and a booklet print designation in a setting field 1209. Note that the present invention is not limited to the functions listed in this case, but various other functions are available and can be selectively displayed by designating another group using the setting field 1206. Also, the present invention is not limited to the configuration of the dialog shown in FIG. 10, and setting items may be added or deleted as needed.

When the user wants to switch an output destination printer on the print setting dialog 1201, he or she switches a printer using a print selection setting field 1202. On the print setting dialog 1201, a print queue "PrinterA" is currently selected. When the user selects, for example, "PrinterB" from this setting field 1202, a print queue "PrinterB" is selected on this dialog. When the user clicks a print button 1210 in this state, print data is output to "PrinterB".

Default settings and a preset saved by the OS will be described below. Descriptions 11a of FIG. 11 shows a file which saves a print queue (printer) selected as a default. Lines 1301 and 1303 include descriptions indicating a default print queue. The print queue selected as a default is described within these tags using a key "DefaultPrintQueue", and a line 1302 indicates that "PrinterA" is selected. Note that this file is saved to have a file name "defaultprinter.plist" under the following directory, since it is saved for each user (in case of a user name "USER_A").

/Users/USER_A/Library/Preferences/

Descriptions 11b of FIG. 11 shows a file which saves setting contents of a preset. The preset is used to save print settings frequently used by the user to have a specific name. For example, assume that default settings of a certain print queue include "simplex" and "1-up print". When the user frequently uses "duplex" and "2-up print", he or she sets "duplex" and "2-up print" by opening the print setting dialog 1201, and saves these settings as a preset by giving an appropriate name. When the user wants to use these settings, he or she selects the saved preset in a preset selection setting field 1203, thus reproducing the saved settings. The setting and saving processes of this preset will be described below.

In the descriptions 11b of FIG. 11, setting contents of a plurality of presets are described between "CustomPresetList" tags described in correspondence with lines 1401 and 1410. One preset is described within "PresetSettings" tags, as described in lines 1402 and 1403. Note that a preset name is described as a parameter of "PresetSettings". The lines 1402 and 1403 describe that the preset indicated by these lines has a preset name "Standard" and setting contents of this preset are "NULL". The preset description file shown in the descriptions 11b of FIG. 11 describes another preset, that is, a preset with a name "Preset1" described in lines 1404 to 1409. The setting contents of this preset are described in lines 1405 to 1407. The line 1405 indicates ColorMode="Color", the line 1406 indicates Duplex="Simplex", and the line 1407 indicates Resolution="600". A line 1408 indicates LastQueue="NULL". Note that an identifier "ABC." is appended in front of each item. This identifier is appended to distinguish respective setting items for respective vendors since the presets are managed by the OS and are used common to each vendor. As described above, the types and setting contents of presets can be revealed by this preset description file.

Descriptions 11c of FIG. 11 shows a file that shows a default preset. Assume that this file is saved as "defaultpreset.plist" under the same /Users/USER_A/Library/Preferences/ directory as that of the file shown in the descriptions lib of FIG. 11. A default preset is described between "PresetInfo" tags in lines 1501 and 1503. The descriptions 11c of FIG. 11 indicates that a preset with a name "Preset1" is selected as a default, as described in a line 1502.

Descriptions 11d of FIG. 11 shows print settings held by the OS. These settings are saved in the RAM 204 for each application process, and are exchanged with the print queue via an API (Application Programming Interface) of the OS. In the descriptions 11d of FIG. 11, print setting contents are described between lines 1601 and 1613. Within "CurrentPrintQueueInfo" tags in lines 1602 and 1604, the currently selected print queue is described. As can be seen from a line 1603, a print queue "PrinterC" is described, and is currently selected. Within "CurrentPresetInfo" tags in lines 1605 and 1607, a currently selected preset is described. As can be seen from a line 1606, a preset "Standard" is described, and is currently selected. Between lines 1608 and 1613, currently set print settings are described. Since the description method is the same as that of the print settings of each preset shown in the descriptions 11b of FIG. 11, a description thereof will not be given. The OS builds up the print settings shown in the descriptions 11d of FIG. 11 for each application process. With the above processes, the printer drivers share information under the control of the OS having the input/output function of printing items and set values.

[Sequence of Print Processing]

Figure 12A:
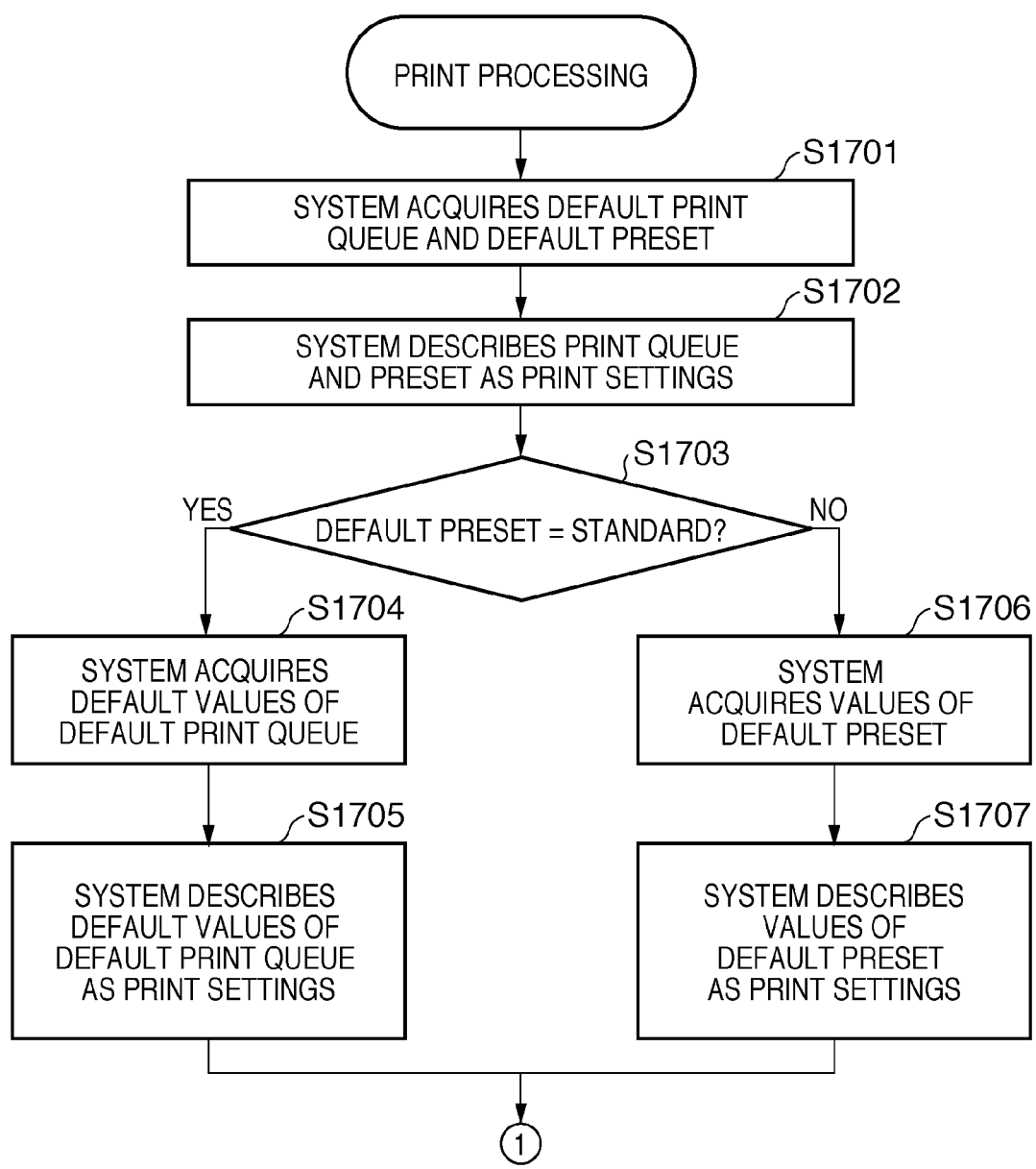
FIGS. 12A and 12B are flowcharts of print processing according to the embodiment.
Figure 12B:
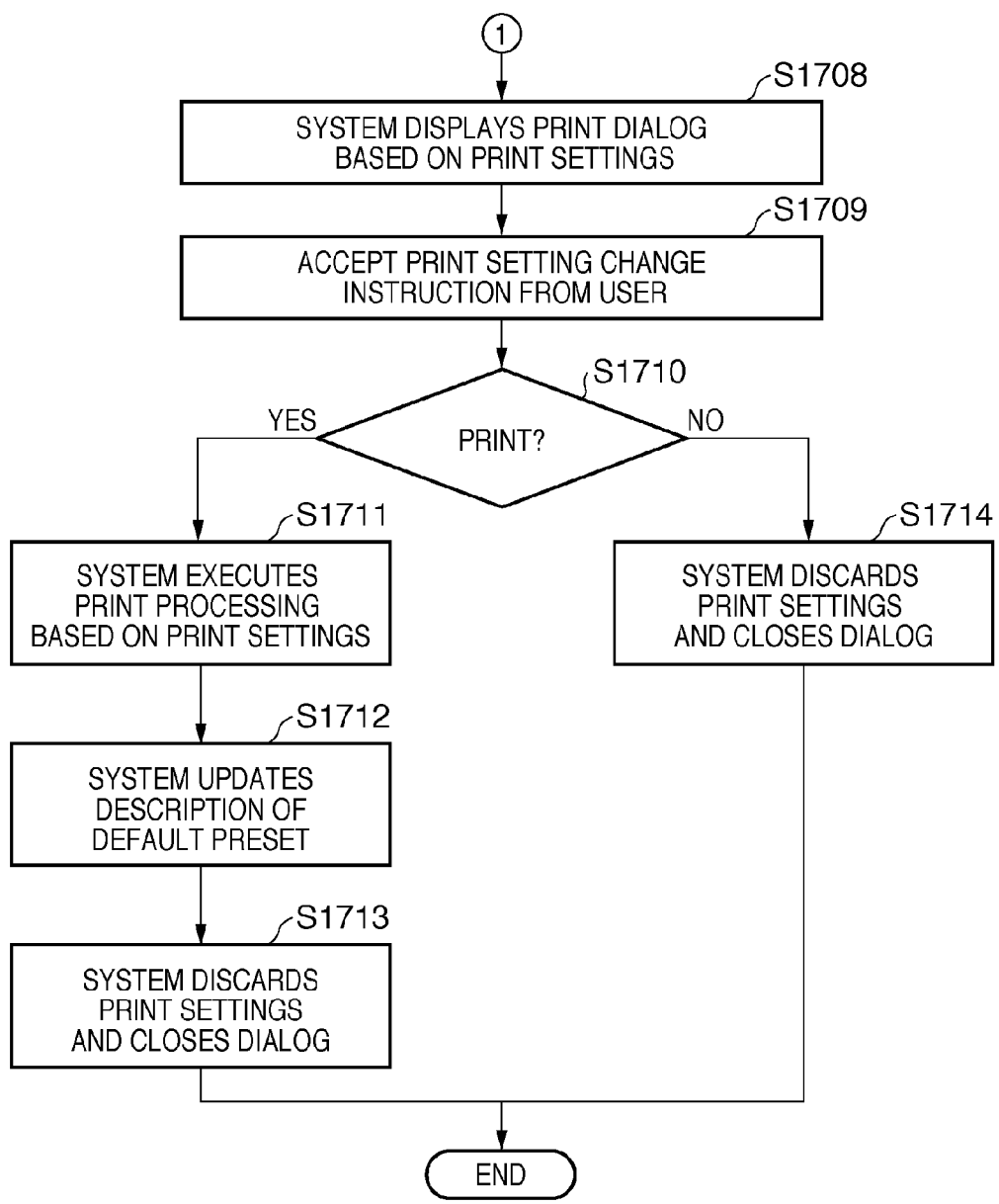

The sequence when the user performs a print operation will be described below. FIGS. 12A and 12B are flowcharts showing print processing.

When the print processing starts, the system (OS) acquires a default print queue and default preset with reference to the file shown in the descriptions 11a of FIG. 11, which saves the print queue selected as a default, and that shown in the descriptions 11c of FIG. 11, which indicates the default preset (S1701). The system describes the acquired print queue and preset in the print settings shown in the descriptions 11d of FIG. 11 (S1702). The system determines if the default preset is "Standard" (S1703). Note that "Standard" does not indicate any specific preset, but it means that no preset is designated. If the default preset is "Standard" (YES in step S1703), the system acquires default values in the default print queue with reference to the printer specification description file shown in the descriptions 8b of FIG. 8 (S1704). The system describes the acquired values in the print settings shown in the descriptions 11d of FIG. 11 as current settings (S1705).

On the other hand, if the default preset is not "Standard" (NO in step S1703), the system acquires values of the default preset with reference to the file shown in the descriptions lib of FIG. 11, which saves the setting contents of the preset (S1706). Then, the system describes the acquired values in the print settings shown in the descriptions 11d of FIG. 11 as current settings (S1707).

After the print settings to be displayed first are built, the system displays the print setting dialog 1201 shown in FIG. 10 based on these print settings (S1708). After the print setting dialog 1201 is displayed, the system accepts an arbitrary print setting change instruction from the user (S1709). This process implements a first acceptance step. In step S1709, the system accepts a print queue re-selection instruction in addition to a set value change instruction of the print settings, and displays a setting screen based on setting items and set values after switching. Handover processing of set values before and after switching of the print queue will be described in detail later using FIGS. 13A and 13B.

After that, the system determines based on a user instruction whether or not to execute print processing (S1710). If it is determined that the print processing is executed (YES in step S1710), the system executes the print processing based on the print settings (S1711). Then, the system updates the file shown in the descriptions 11*c* of FIG. 11 indicating the default preset by the preset at that time (S1712). The system then discards the print settings, and closes the print dialog (S1713). On the other hand, if the print processing is not executed, and is canceled (NO in step S1710), the system discards the print settings, and closes the print dialog (S1714).

[Print Setting Handover Method]

How to hand over the print settings when the user switches the print queue on the print setting dialog 1201 in step S1709 in FIG. 12B, which technique is especially a characteristic feature of the present invention, will be described below.

Figure 13A:
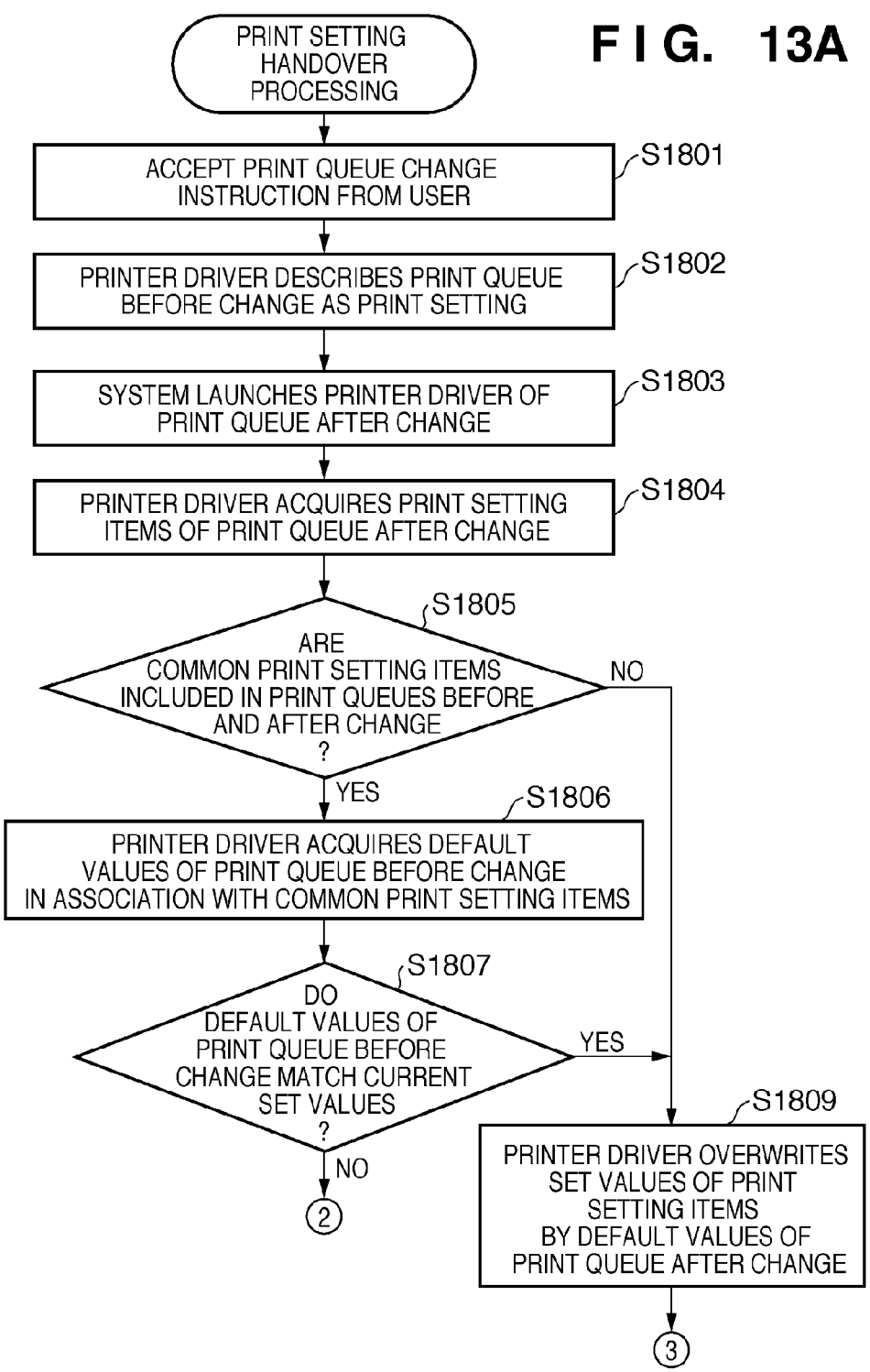
FIGS. 13A and 13B are flowcharts of print setting handover processing according to the embodiment.
Figure 13B:
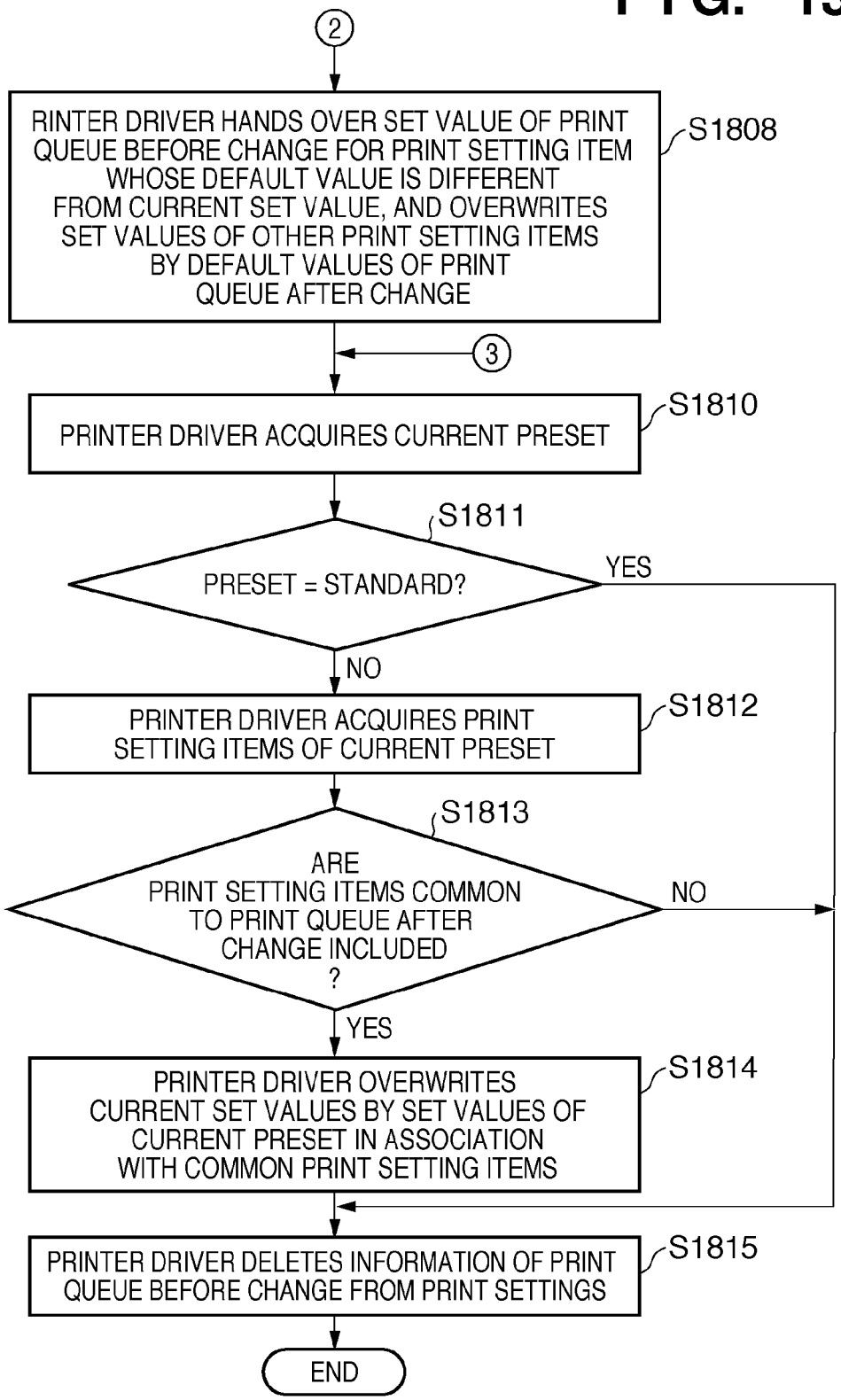

FIGS. 13A and 13B are flowcharts showing print setting handover processing. In the following description, a module, which is implemented when the CPU executes a printer driver program, is called a printer driver.

Print queue related processing will be described first.

In step S1801, the system accepts a print queue switching instruction from the user via the print queue selection setting field 1202 in FIG. 10. In step S1802, the printer driver of the print queue selected so far describes information of the print queue before switching in the corresponding line 1612 in the print settings shown in the descriptions 11*d* of FIG. 11.

After that, the system launches a printer driver of a print queue after switching in step S1803. At this time, the system updates information in the line 1603 indicating the print queue in the descriptions 11*d* of FIG. 11. As for other print settings, set values before switching of the print queue are handed over intact.

In step S1804, the printer driver acquires setting items of the print queue after switching with reference to the printer specification description file (the descriptions 8*b* of FIG. 8) of the print queue after switching. In step S1805, the printer driver compares the setting items of the print queue before switching with those of the print queue after switching, and determines whether or not common setting items are included. This process implements setting item determination processing.

If it is determined that common setting items are included (YES in step S1805), the printer driver acquires default values of the print queue before switching with reference to the printer specification description file (the descriptions 8*b* of FIG. 8) of the print queue before switching in step S1806. Note that the information of the print queue before switching can be obtained with reference to the line 1612 of the print settings shown in the descriptions 11*d* of FIG. 11. In step S1807, the printer driver compares the default values of the print queue before switching with the current set values in association with common items.

Note that the "current set values" mean set values of respective setting items which are set in the print queue before switching at the time of switching. This process implements set value determination processing.

As a result of comparison of the set values, if a setting item whose default value does not match the current set value is included (NO in step S1807), the printer driver hands over the current set value intact in association with the setting item whose default value does not match the current set value in step S1808. Then, the printer driver updates, for the setting items other than that whose default value does not match the current set value, the corresponding fields of the print settings in the descriptions 11*d* of FIG. 11 by the default values of the print queue after switching with reference to the printer specification description file (the descriptions 8*b* of FIG. 8) of the print queue after switching. Note that the information of the print queue after switching can be obtained with reference to the line 1603 as the corresponding field in the print settings. The process then advances to step S1810.

If NO in step S1805, or if YES in step S1807, the printer driver updates the print settings by the default values of the print queue after switching in step S1809. After that, the process advances to step S1810.

Preset related processing will be described below. In step S1810, the printer driver acquires the current preset with reference to the line 1606 in the print settings shown in the descriptions 11*d* of FIG. 11. The "current preset" means a preset which is held by the OS, and is set to be applied in the corresponding printer driver. The printer driver determines in step S1811 if the current preset is "Standard". This process implements a preset determination step.

If it is determined that the current preset is not "Standard" (NO in step S1811), the printer driver acquires print settings of the current preset with reference to the preset description file shown in the descriptions 11*c* of FIG. 11 in step S1812. In step S1813, the printer driver compares the setting items of the print queue after switching with those of the current preset to determine if common setting items are included. This process implements preset setting item determination processing.

If common setting items are included (YES in step S1813), the printer driver overwrites and updates the corresponding fields of the print settings shown in the descriptions 11*d* of FIG. 11 by the set values of the current preset acquired in step S1812 in association with the common print setting items in step S1814. If YES in step S1811, or if NO in step S1813, the printer driver skips the preset related processing, and the process jumps to step S1815.

In step S1815, the printer driver updates, by "NULL", the line 1612 corresponding to the information of the print queue before switching in the print settings shown in the descriptions 11*d* of FIG. 11.

[Practical Handover Example of Set Values]

The aforementioned handover method will be explained below using practical examples of print queues and presets. FIGS. 14A and 14B show preconditions associated with the print queues and presets in this case.

Referring to FIG. 14A, assume that as print queues, "PrinterA" as a print queue 1901, "PrinterB" as a print queue 1902, and "PrinterC" as a print queue 1903 are registered. FIG. 14A shows print settings of respective print queues and set values which can be set in respective items. Note that underlined items in FIG. 14A mean default values. That is, for "PrinterA", "Mono" or "Color" is selectable as a ColorMode item, and its default value is "Color". Also, "Simplex" or "Duplex" is selectable as a Duplex item, and its default value is "Simplex". "600" or "1200" is selectable as a Resolution item, and its default value is "1200". A set value of a LastQueue item is not displayed on the print dialog (FIG. 10), and its initial value is "NULL". Also, the print settings and set values of "PrinterB" and "PrinterC" are as described in the table in FIG. 14A.

Note that FIG. 14A shows some of the functions of printers, and functions to be handed over are not limited to these functions.

On the other hand, as for settings associated with presets, "Standard" and "Preset1" are registered, as shown in FIG. 14B. "Standard" as a preset 2001 is a standard preset, and includes set values "NULL" for all print settings.

On the other hand, "Preset1" as a preset 2002 includes ColorMode="Color", Duplex="Simplex", Resolution="600", and LastQueue="NULL".

A case will be examined below wherein the user opens the print setting dialog 1201 by selecting "print" from a menu of an application, and changes print settings for the purpose of processing of the following cases under the above preconditions. Note that the cases to be described below are merely examples, and do not limit setting items, set values, and description formats.

[Case 1]

The user switches the print queue from a default set value to "PrinterB" (PrinterA⇒ PrinterB).

The sequence for handing over set values of this case 1 will be described below along FIGS. 13A and 13B.

In step S1801, the system accepts a switching instruction from "PrinterA" as a default setting of the print queue to "PrinterB" from the user. In step S1802, the printer driver describes the print queue "PrinterA" before switching in the corresponding line 1612 in the print settings shown in the descriptions 11d of FIG. 11. After that, the system launches a printer driver of the print queue "PrinterB" after switching in step S1803. At this time, the system updates, by "PrinterB", the line 1603 associated with the print queue in the print settings shown in the descriptions 11d of FIG. 11. Since set values before switching of other print settings are handed over intact, ColorMode="Color", Duplex="Simplex", Resolution="1200", and LastQueue="PrinterA".

In step S1804, the printer driver acquires setting items of the print queue after switching with reference to the printer specification description file (the descriptions 8b of FIG. 8) of the print queue "PrinterB" after switching.

In step S1805, the printer driver compares the setting items of the print queue "PrinterA" before switching with those of the print queue "PrinterB" after switching to determine if common setting items are included. In this case, since common setting items are included, YES is determined in step S1805, and the printer driver refers to the printer specification description file (the descriptions 8b of FIG. 8) of the print queue "PrinterA" before switching in step S1806. Then, the printer driver acquires default values (set values of the print queue 1901 shown in FIG. 14A) of the print queue "PrinterA" before switching.

In step S1807, the printer driver compares the default values of the print queue "PrinterA" before switching with the current set values in association with the common items. In this case, since no setting item whose default value does not match the current set value is included, the printer driver updates the print settings by the default values (respective set values of the print queue 1902 shown in FIG. 14A) of the print queue "PrinterB" after switching in step S1809.

Subsequently, in step S1810, the printer driver acquires the current preset with reference to the corresponding line 1606 in the print settings shown in the descriptions 11d of FIG. 11. The printer driver determines in step S1811 if the current preset is "Standard". In this case, since the current preset is "Standard", the printer driver skips the preset related processing. Finally, in step S1815, the printer driver updates, by "NULL", the line 1612 corresponding to the information of the print queue "PrinterA" before switching in the print settings shown in the descriptions 11d of FIG. 11. As a result of the aforementioned processes, the print settings include ColorMode="Color", Duplex="Duplex", Resolution="600", and LastQueue="NULL". In this way, upon switching the print queues, the set values can be handed over while reflecting the default values of the print queue after switching.

A case will be examined below wherein the user opens the print setting dialog 1201 by selecting "print" from a menu of an application, and changes print settings for the purpose of the following processing under the same preconditions (FIGS. 14A and 14B).

[Case 2]

The user changes the ColorMode item from a default setting to "Mono" (Color⇒ Mono).

The user switches the print queue to "PrinterB" (PrinterA ⇒ PrinterB).

The sequence for handing over set values of this case 2 will be described below along FIGS. 13A and 13B.

Print settings before the print queue is switched include ColorMode="Mono", Duplex="Simplex", Resolution="1200", and LastQueue="NULL".

In this state, in step S1801, the system accepts a switching instruction from "PrinterA" as a default setting of the print queue to "PrinterB" from the user. In step S1802, the printer driver describes information of the print queue "PrinterA" before switching in the corresponding line 1612 in the print settings shown in the descriptions 11d of FIG. 11. After that, the system launches a printer driver of the print queue "PrinterB" after switching in step S1803. At this time, the system updates the line 1603 associated with the print queue in the print settings shown in the descriptions 11d of FIG. 11. Since set values before switching of other print settings are handed over intact, ColorMode="Mono", Duplex="Simplex", Resolution="1200", and LastQueue="PrinterA".

In step S1804, the printer driver acquires setting items of the print queue "PrinterB" after switching with reference to the printer specification description file (the descriptions 8b of FIG. 8) of the print queue "PrinterB" after switching.

In step S1805, the printer driver compares the setting items of the print queue "PrinterA" before switching with those of the print queue "PrinterB" after switching to determine if common setting items are included. In this case, since common setting items are included, YES is determined in step S1805, and the printer driver refers to the printer specification description file (the descriptions 8b of FIG. 8) of the print queue "PrinterA" before switching in step S1806. Then, the printer driver acquires default values (set values of the print queue 1901 shown in FIG. 14A) of the print queue "PrinterA" before switching.

In step S1807, the printer driver compares the default values of the print queue "PrinterA" before switching with the current set values in association with the common items. In this case, since the setting item ColorMode whose default value does not match the current set value is included, the printer driver hands over the set value (Mono) intact in association with the ColorMode item in step S1808. Then, as for other setting items, the printer driver updates the print settings by the default values of the print queue "PrinterB" after switching with reference to the printer specification description file (the descriptions 8b of FIG. 8) of the print queue "PrinterB" after switching.

Subsequently, in step S1810, the printer driver acquires the current preset with reference to the corresponding line 1606 in the print settings shown in the descriptions 11d of FIG. 11.

The printer driver determines in step S1811 if the current preset is "Standard". In this case, since the current preset is "Standard", the printer driver skips the preset related processing. In step S1815, the printer driver updates, by "NULL", the line 1612 corresponding to the information of the print queue "PrinterA" before switching in the print settings shown in the descriptions 11d of FIG. 11.

As a result of the aforementioned processes, the print settings include ColorMode="Mono", Duplex="Duplex", Resolution="600", and LastQueue="NULL".

In this way, upon switching the print queues, the set value of the print setting, which is changed by the user, can be handed over, and set values of other print settings can be handed over while reflecting the default values of the print queue after switching.

Furthermore, a case will be examined below wherein the user opens the print setting dialog 1201 by selecting "print" from a menu of an application, and changes print settings for the purpose of the following processing under the same preconditions (FIGS. 14A and 14B).

[Case 3]
The user changes a preset from a default setting to "Preset1" (Standard⇒ Preset1).
The user switches the print queue to "PrinterC" (PrinterA ⇒ PrinterC).
The user switches the print queue to "PrinterA" (PrinterC ⇒ PrinterA).

The sequence for handing over set values of this case 3 will be described below along FIGS. 13A and 13B.

Print settings upon switching the print queue from "PrinterA" to "PrinterC" include ColorMode="Mono", Duplex="Simplex", Resolution="600", and LastQueue="NULL". The reason why ColorMode="Mono" is that the print queue "PrinterC" can select only "Mono" as the ColorMode item. In such case, the set value is forcibly set to be "Mono" which can be set.

In this state, in step S1801, the system accepts a print queue switching instruction from "PrinterC" to "PrinterA" from the user. In this case, as in case 1, the processes in steps S1802, S1803, S1804, S1805, and S1809 are executed in turn. As a result, print settings at that time include ColorMode="Mono", Duplex="Simplex", Resolution="600", and LastQueue="PrinterC".

Subsequently, in step S1810, the printer driver acquires the current preset with reference to the corresponding line 1606 in the print settings shown in the descriptions 11d of FIG. 11. The printer driver then determines in step S1811 if the current preset is "Standard". In this case, since the current preset is not "Standard", the printer driver acquires the print settings of the current preset "Preset1" with reference to the preset description file shown in the descriptions 11c of FIG. 11 in step S1812.

In step S1813, the printer driver compares the setting items of the print queue "PrinterA" after switching with those of the current preset "Preset1" to determine if common setting items are included. In this case, common setting items are included. Hence, in step S1814, the printer driver updates the common print setting items by the set values (ColorMode="Color") of the current preset "Preset1" acquired in step S1812. Then, in step S1815, the printer driver updates the line 1612 corresponding to the information of the print queue "PrinterC" before switching in the print settings by "NULL".

As a result of the aforementioned processes, the print settings include ColorMode="Color", Duplex="Simplex", Resolution="600", and LastQueue="NULL".

As described above, upon switching the print queues, when the preset is other than "Standard", values can be handed over while reflecting the set values of that preset.

The sequences for handing over print settings have been explained using the practical cases. According to this embodiment, the set values of the print settings can be handed over as intended by the user in correspondence with situations of the set values of the respective setting items.

Second Embodiment

Figure 15A:
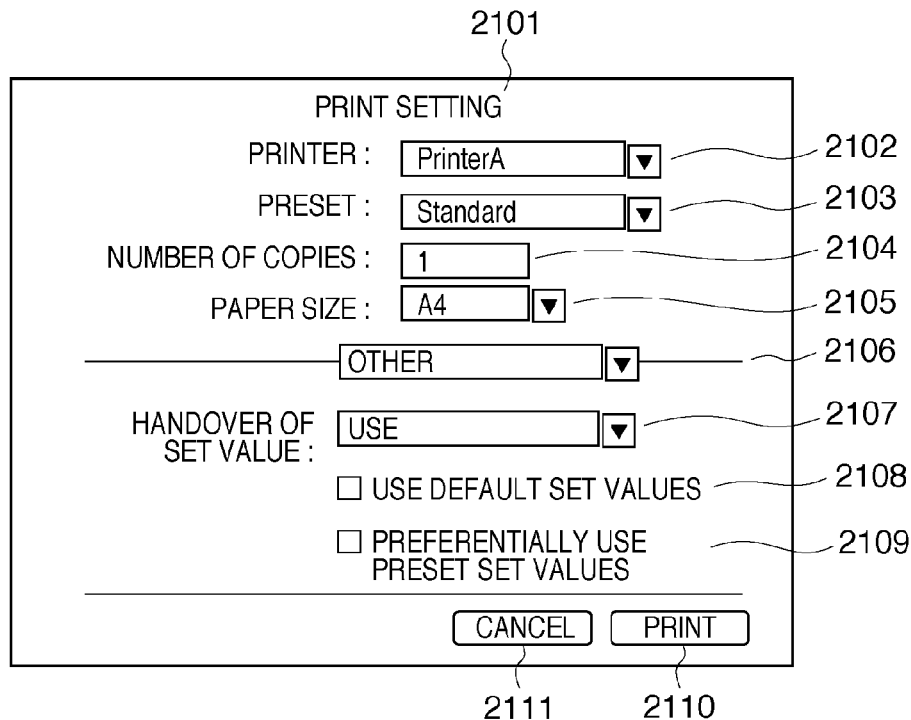
FIGS. 15A and 15B are views showing dialogs according to the embodiment.
Figure 15B:
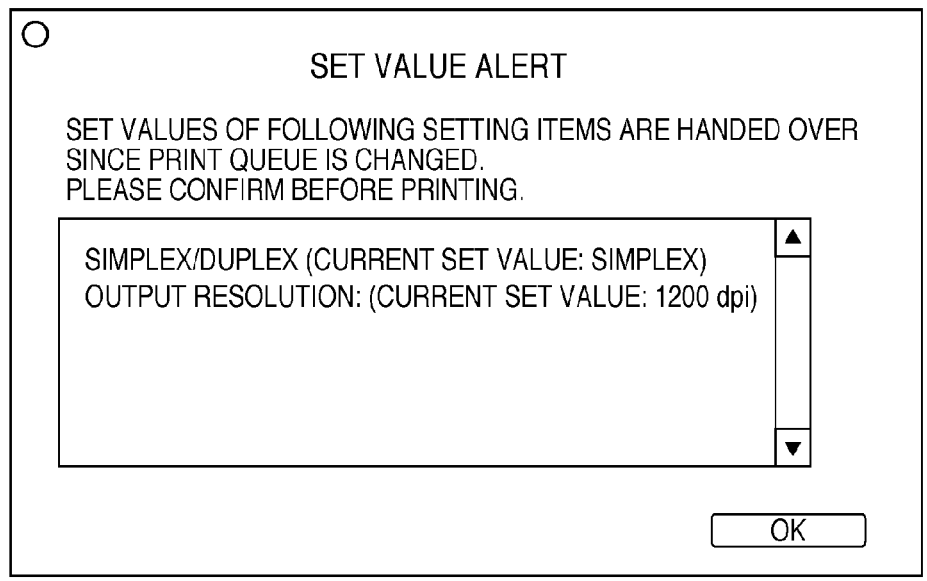

The second embodiment which adopts the same method as in the aforementioned first embodiment will be described below. FIG. 15A shows a print dialog when the user selects "other" in a setting field 1206 shown in FIG. 10 as a function group that controls the method of the first embodiment.

Since setting fields 2102 to 2106 and buttons 2110 and 2111 on a print setting dialog 2101 are the same as the setting fields 1202 to 1206 and buttons 1210 and 1211 on the print setting dialog 1201 shown in FIG. 10, a description thereof will not be repeated.

FIG. 15A shows a state in which functions related to "other" in a setting field 2106 are displayed. The "other" related functions include a setting field 2107 that allows the user to set whether or not to apply set value handover processing, a setting field 2108 that allows the user to set whether or not to apply default values of a print queue to the set value handover processing, and a setting field 2109 that allows the user to set whether or not to preferentially use settings of a preset. Note that a set value of the setting field 2107 can be selected from "use" and "not use". When the user selects the latter value, the setting fields 2108 and 2109 are not selectable by, for example, graying them out. The system accepts user instructions for these setting fields 2107 to 2109 to execute processing according to this embodiment.

Figure 16:
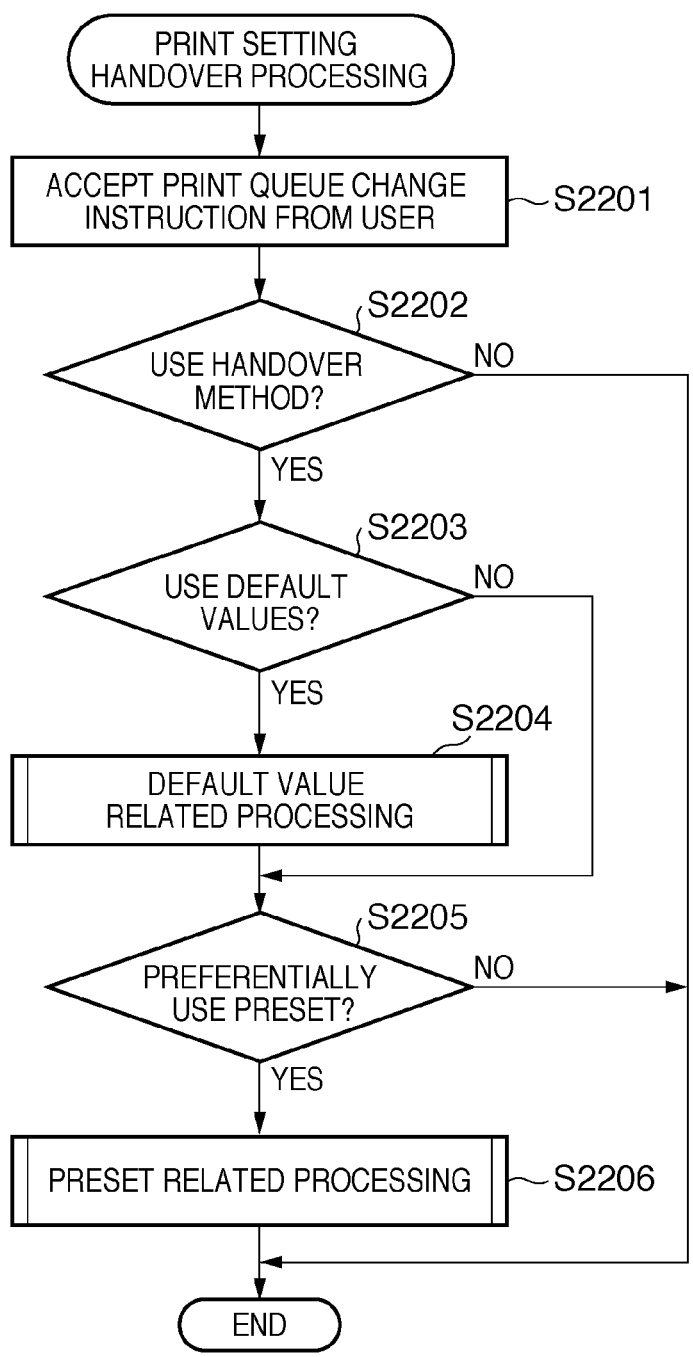
FIG. 16 is a flowchart of print setting handover processing according to the second embodiment.

FIG. 16 is a flowchart showing print setting handover processing according to this embodiment. Note that default value related processing in step S2204 corresponds to steps S1802 to S1808 and step S1809 in FIG. 13A, and preset related processing in step S2206 corresponds to steps S1810 to S1815 in FIG. 13B.

In step S2201, the system accepts a print queue switching instruction from the user via the setting field 2102 in FIG. 15A. This process implements a second acceptance step. Then, the system determines in step S2202 whether or not to use this handover method, with reference to the setting designated by the user via the setting field 2107 in association with ON/OFF of application of the set value handover processing. If it is determined that this handover method is not used (NO in step S2202), this sequence ends. That is, only the conventional print queue switching processing is executed without any special processing.

If it is determined that this handover method is used (YES in step S2202), the system determines in step S2203 whether or not to use default values of the print queue in the set value handover processing. In this case, whether or not to use default value is determined with reference to the setting designated by the user via the setting field 2108. If it is determined that default values are used (YES in step S2203), the system executes the default value related processing in step S2204. Otherwise (NO in step S2203), the system skips the processing in step S2204, and the process jumps to step S2205.

The system determines in step S2205 whether or not to preferentially use the settings of a preset. In this case, whether or not to preferentially use the preset is determined with reference to the setting designated by the user via the setting field 2109. If it is determined that the preset is preferentially used (YES in step S2205), the system executes the preset related processing in step S2206. Otherwise (NO in step S2205), the system skips the processing in step S2206, and ends this sequence.

As described above, the setting handover processing in print settings can be set according to the user's intention, thus improving the usability in print processing.

Third Embodiment

The third embodiment which adopts the same method as in the first embodiment will be described below.

Figure 17:
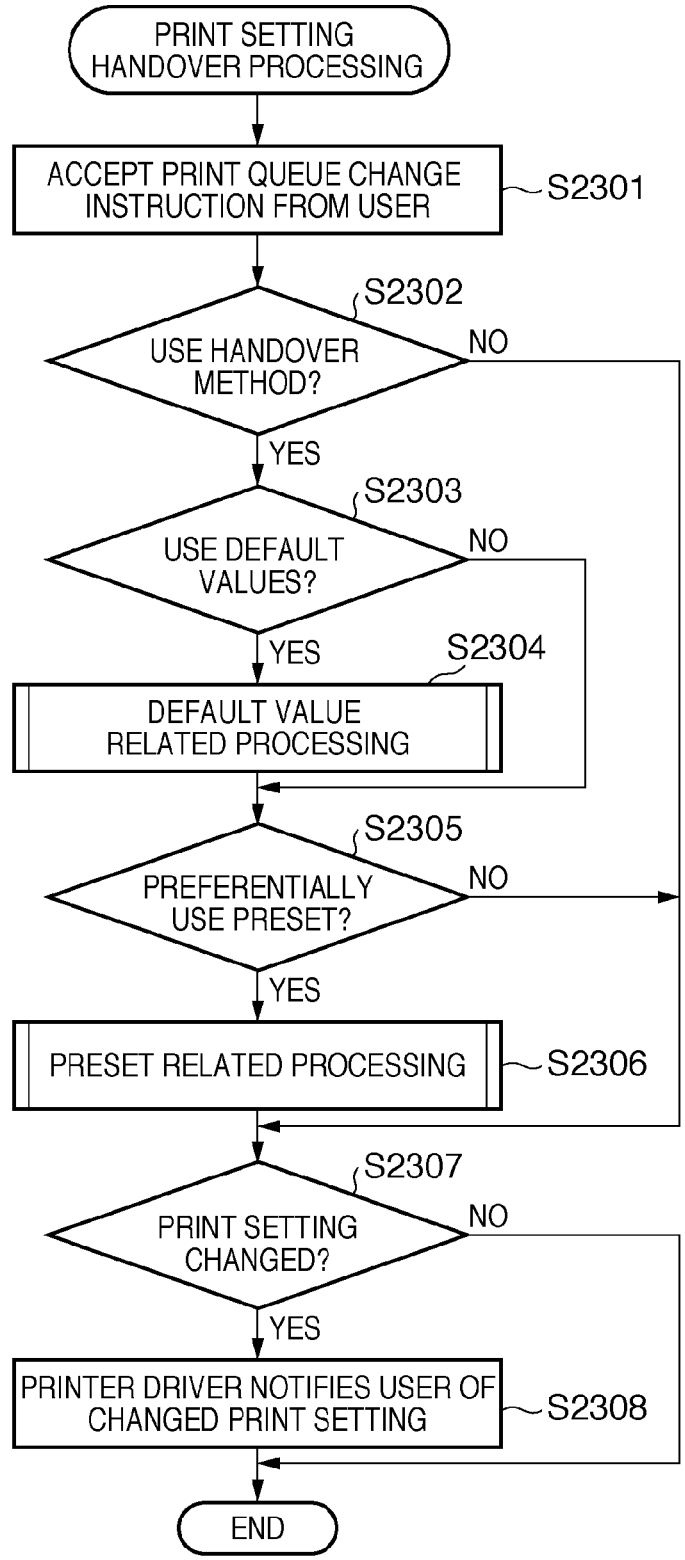
FIG. 17 is a flowchart of print setting handover processing according to the third embodiment.

FIG. 17 is a flowchart showing print setting handover processing according to this embodiment. Note that steps S2301 to S2306 are the same as steps S2201 to S2206 in FIG. 16, and a description thereof will not be repeated.

A printer driver determines in step S2307 if print setting items have changed before and after switching of print queues. If it is determined that the print settings have changed (YES in step S2307), the printer driver displays a change notification dialog shown in FIG. 15B to notify the user that the print settings have changed in step S2308. If the print settings have not changed (NO in step S2307), this sequence ends.

In this way, even when setting changes which are not intended by the user have occurred upon switching of the print queues, the user can recognize these changes since he or she receives a message that advises accordingly. Thus, the usability in print processing can be improved.

The three embodiments have been described. The present invention is not limited to these embodiments, and various other embodiments may be made. For example, in the first embodiment, information of a print queue before switching is used as one of hidden parameters of print settings. Alternatively, equivalent information may be stored in an external file. In the second and third embodiments, the dialog is used as means for notifying the user of print setting changes. Alternatively, equivalent information may be displayed as one option of the setting field 1206 shown in FIG. 10.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-211027, filed Sep. 11, 2009, which is hereby incorporated by reference herein in its entirety.

What is claimed is:

1. A control method of an information processing apparatus in which a plurality of printer drivers for setting set values in setting items of print data to be output by a printing apparatus are installed, the method comprising:

under the control of an operating system having a function of controlling the plurality of printer drivers to share set values set using the plurality of printer drivers, a setting item determination step of determining, upon switching of output target printing apparatuses between a plurality of printing apparatuses corresponding to the plurality of printer drivers, whether or not setting items according to a printing apparatus before switching and setting items according to a printing apparatus after switching include common setting items;

a set value determination step of determining, in association with the common setting items determined in the setting item determination step, whether or not default set values in the printing apparatus before switching match set values set upon switching of the printing apparatuses;

a handover step of handing over the set value set upon switching of the printing apparatuses in association with the setting item which is determined in the set value determination step that the set value of the setting item does not match the default set value; and a setting step of setting a default set value in the printing apparatus after switching in association with the setting item which is determined in the set value determination step that the set value of the setting item matches the default set value.

2. The method according to claim 1, further comprising:

a first acceptance step of accepting, from a user, an instruction to execute set value change processing in the setting item determination step, the set value determination step, the handover step, and the setting step upon switching of the printing apparatuses, wherein upon accepting the instruction in the first acceptance step, the set value change processing in the setting item determination step, the set value determination step, the handover step, and the setting step upon switching of the printing apparatuses is executed.

3. The method according to claim 1, further comprising:

a storage step of storing a preset which defines, in advance, print setting items and set values to be set in the print data;

a preset setting item determination step of determining, upon switching of the printing apparatuses, whether or not setting items according to the printing apparatus after switching and setting items included in the stored preset include common setting items; and an overwriting step of overwriting set values of the common setting items determined in the preset setting item determination step by the set values in the preset.

4. The method according to claim 3, further comprising:

a second acceptance step of accepting, from a user, an instruction to execute set value change processing in the preset setting item determination step and the overwriting step upon switching of the printing apparatuses, wherein the set value change processing in the preset setting item determination step and the overwriting step upon switching of the printing apparatuses is executed.

5. The method according to claim 1, further comprising:

a notifying step of notifying, in accordance with a change of a set value set upon switching of the printing apparatuses, a message that advises accordingly.

6. A control method of an information processing apparatus in which a plurality of printer drivers for setting set values in setting items of print data to be output by a printing apparatus are installed, the method comprising:

under the control of an operating system having a function of controlling the plurality of printer drivers to share set values set using the plurality of printer drivers, a storage step of storing a preset which defines, in advance, print setting items and set values to be set in the print data;

a preset setting item determination step of determining, upon switching of output target printing apparatuses between a plurality of printing apparatuses corresponding to the plurality of printer drivers, whether or not setting items according to a printing apparatus after switching and setting items included in the stored preset include common setting items; and an overwriting step of overwriting set values of the common setting items determined in the preset setting item determination step by the set values in the preset.

7. An information processing apparatus in which a plurality of printer drivers for setting set values in setting items of print data to be output by a printing apparatus are installed, said apparatus comprising:

under the control of an operating system having a function of controlling the plurality of printer drivers to share set values set using the plurality of printer drivers, a setting item determination unit which determines, upon switching of output target printing apparatuses between a plurality of printing apparatuses corresponding to the plurality of printer drivers, whether or not setting items according to a printing apparatus before switching and setting items according to a printing apparatus after switching include common setting items;

a set value determination unit which determines, in association with the common setting items determined by said setting item determination unit, whether or not default set values in the printing apparatus before switching match set values set upon switching of the printing apparatuses;

a handover unit which hands over the set value set upon switching of the printing apparatuses in association with the setting item which is determined by said set value determination unit that the set value of the setting item does not match the default set value; and a setting unit which sets a default set value in the printing apparatus after switching in association with the setting item which is determined by said set value determination unit that the set value of the setting item matches the default set value.

8. An information processing apparatus in which a plurality of printer drivers for setting set values in setting items of print data to be output by a printing apparatus are installed, said apparatus comprising:

under the control of an operating system having a function of controlling the plurality of printer drivers to share set values set using the plurality of printer drivers, a storage unit which stores a preset which defines, in advance, print setting items and set values to be set in the print data;

a preset setting item determination unit which determiners, upon switching of output target printing apparatuses between a plurality of printing apparatuses corresponding to the plurality of printer drivers, whether or not setting items according to a printing apparatus after switching and setting items included in the stored preset include common setting items; and an overwriting unit which overwrites set values of the common setting items determined by said preset setting item determination unit by the set values in the preset.

9. A non-transitory computer-readable medium storing a program making a computer function as:

under the control of an operating system having a function of controlling a plurality of printer drivers to share set values set using the plurality of printer drivers, a setting item determination unit which determines, upon switching of output target printing apparatuses between a plurality of printing apparatuses corresponding to the plurality of printer drivers, whether or not setting items according to a printing apparatus before switching and setting items according to a printing apparatus after switching include common setting items;

a set value determination unit which determines, in association with the common setting items determined by said setting item determination unit, whether or not default set values in the printing apparatus before switching match set values set upon switching of the printing apparatuses;

a handover unit which hands over the set value set upon switching of the printing apparatuses in association with the setting item which is determined by said set value determination unit that the set value of the setting item does not match the default set value; and a setting unit which sets a default set value in the printing apparatus after switching in association with the setting item which is determined by said set value determination unit that the set value of the setting item matches the default set value.

10. A non-transitory computer-readable medium storing a program making a computer function as:

under the control of an operating system having a function of controlling a plurality of printer drivers to share set values set using the plurality of printer drivers, a storage unit which stores a preset which defines, in advance, print setting items and set values to be set in print data;

a preset setting item determination unit which determiners, upon switching of output target printing apparatuses between a plurality of printing apparatuses corresponding to the plurality of printer drivers, whether or not setting items according to a printing apparatus after switching and setting items included in the stored preset include common setting items; and an overwriting unit which overwrites set values of the common setting items determined by said preset setting item determination unit by the set values in the preset.

* * * * *